Dec. 7, 1926.                                           1,609,460
                        W. S. BUTTLES
        APPARATUS FOR MOLDING ARTICLES UNDER HIGH PRESSURE
                Filed Jan. 28, 1925          2 Sheets-Sheet 1
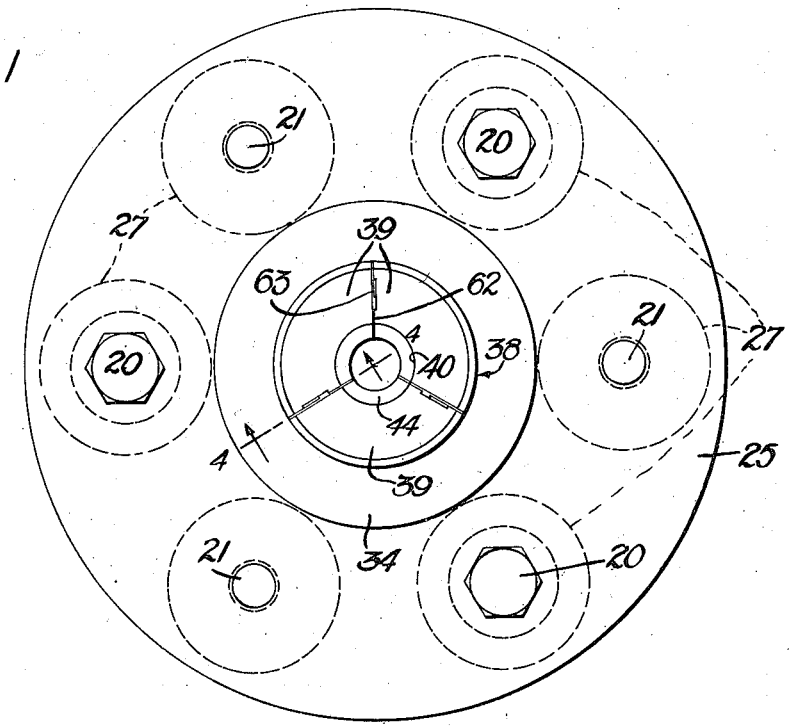
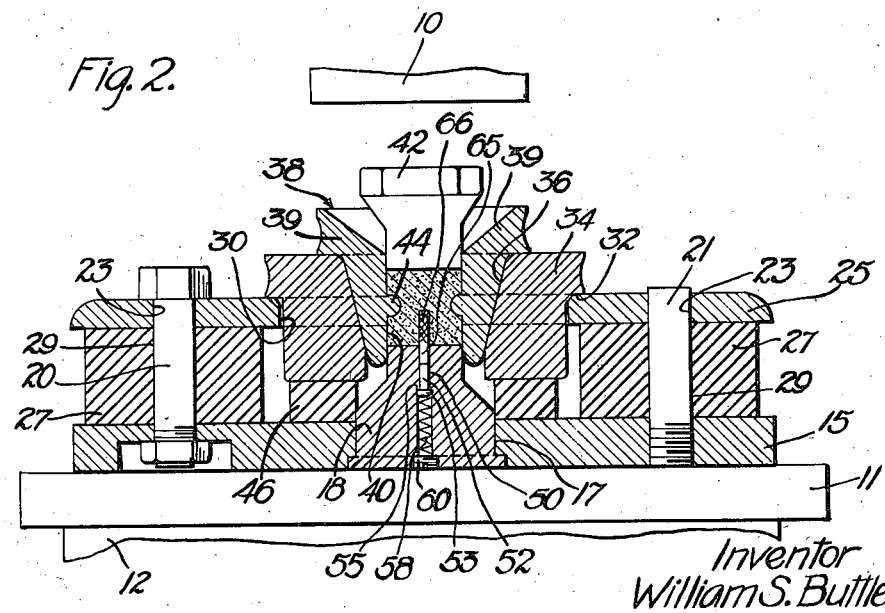
Inventor
William S. Buttles
by H. A. Pattison
        Atty.

Dec. 7, 1926.　　　　W. S. BUTTLES　　　　1,609,460

APPARATUS FOR MOLDING ARTICLES UNDER HIGH PRESSURE

Filed Jan. 28, 1925　　　2 Sheets-Sheet 2

Inventor
William S. Buttles,
by [signature] Atty.

Patented Dec. 7, 1926.

1,609,460

UNITED STATES PATENT OFFICE.

WILLIAM STEVENS BUTTLES, OF CHICAGO, ILLINOIS, ASSIGNOR TO WESTERN ELECTRIC COMPANY, INCORPORATED, OF NEW YORK, N. Y., A CORPORATION OF NEW YORK.

APPARATUS FOR MOLDING ARTICLES UNDER HIGH PRESSURE.

Application filed January 28, 1925. Serial No. 5,224.

This invention relates to improved apparatus for molding articles under high pressures, and has for its primary object the provision of apparatus of the character described, in which articles, that because of their form have been molded in sections heretofore, can each be molded in a single pressing operation, and from which the molded articles can be quickly and easily removed.

In one embodiment of the invention, hydraulic pressure is applied to two forming members which in turn apply pressure to finely divided magnetic material disposed within an annular die and form the material into a magnet core, the die comprising a plurality of separable segments removably seated in a tapered aperture which is formed in a holder. The forming members are disposed in opposed relation and blocks of rubber interposed between one of them and the holder unbalance the pressure exerted upon the magnetic material to such an extent that relative movement between the annular die and its holder is prevented.

Other objects and features of the invention will become apparent as the following detailed description progresses, reference being had to the accompanying drawings, wherein Fig. 1 is a plan view of one portion of an apparatus which embodies the invention;

Fig. 2 is a central section through the apparatus;

Figure 3:
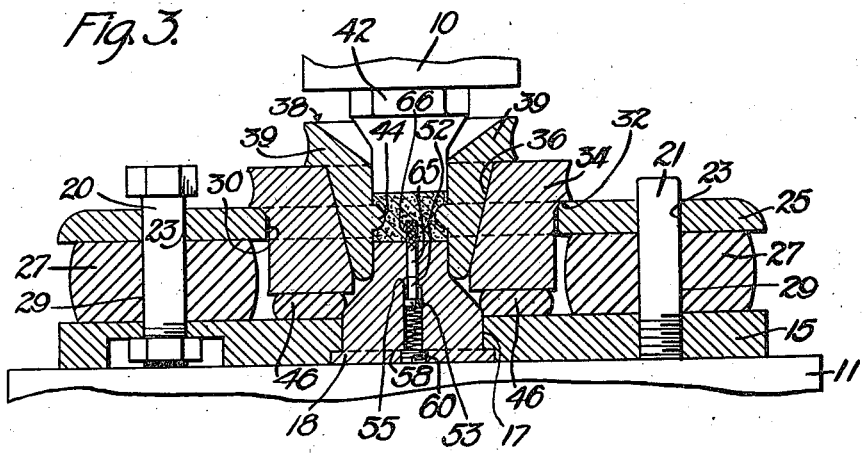
Fig. 3 is a central section taken on the same line as Fig. 2 but with certain parts of the apparatus shown in changed positions.
Figure 4:
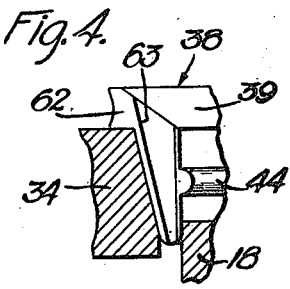
Fig. 4 is a section taken on line 4—4 of Fig. 1.

In the drawings, 10 and 11 are upper and lower platens, respectively, of a hydraulic press, the lower platen 11 being mounted upon a ram 12. 15 is a base plate resting upon the lower platen 11 and having a central aperture 17 in which is seated a punch or forming member 18. Threaded in and projecting upwardly from the base plate 15 are bolts 20 and guide pins 21.

The bolts 20 and guide pins 21 pass through apertures 23 formed in a plate 25 disposed above the base plate 15 and held in spaced relation with respect thereto by collars 27 of rubber or any other suitable material. The collars 27 are held in position between the plate 25 and the base plate 15 by the bolts 20 and the guide pins 21, the collars 27 being provided with central apertures 29 to receive the bolts and the guide pins. Seated in a central aperture 30 formed in the plate 25 and having a shoulder 32 resting upon the plate 25 is a die holder 34 having a central tapered aperture 36. Seated in the tapered aperture 36 is a die member 38 formed of a plurality of segments 39. The die member 38 has a central opening 40 which is substantially cylindrical in shape and is adapted to receive the forming member 18 and a forming member 42. Formed upon the segments 39 and projecting into the opening 40 are beads 44 which together form a continuous bead around the opening 40. The angle of the wall of the tapered aperture 36 is greater than the maximum angle of static rest so that the die 38 may be readily removed from its holder 34. Interposed between the holder 34 and the base plate 15 is a collar 46 of rubber or any other suitable resilient material. The collar 46 cooperates with the collars 27 for a purpose which will presently appear.

Slidably journaled in a bore 50 in the forming member 18 is a pin 52 having a head 53 which is urged against a shoulder 55 formed in the bore, the head 52 being urged against the shoulder 53 by a compression spring 58 interposed between the head and a plug 60 threaded into the bore.

As shown in Fig. 1, each pair of adjacent segments 39 have contiguous radially disposed surfaces 62, one surface 62 of each segment being provided with a groove 63 adapted to receive matter extruded or forced from the opening 40 through any clearance which must of necessity be allowed between contiguous surfaces 62.

The above described apparatus is particularly adapted to form spool shaped magnet cores from finely divided magnetic material such as particles of iron preferably coated with a material of higher resistivity to reduce eddy current loss in the magnet cores. In the operation of the apparatus the forming member 42 is first withdrawn from the opening 40 and a predetermined quantity of coated and finely divided magnetic material is placed in the opening, a metallic insert 65 being first placed in the bore 50 in a manner illustrated in Fig. 2. The forming member 42 is then positioned in the opening 40 as illustrated in Fig. 2 and the hydraulic press is operated to urge the lower platen 11 toward the upper platen 10. This results in relative movement between the forming members 18 and 42 which are urged toward each other to apply pressure to the magnetic material disposed in the opening 40. As the magnetic material does not flow readily from that portion of the opening 40 above, to that below the beads 44, an annular groove is formed in the magnet core at a point substantially midway between its ends. The inner end of the insert 65 remains in substantially the same position with respect to the beads 44 throughout the pressing operation and is firmly embedded in the magnet core at the completion of the operation, the insert 65 being preferably knurled as at 66.

In practice it has been found that pressure exerted upon the segments 39 will cause the segments to be forced from their correct positions within the tapered aperture 36 unless means is provided to unbalance the pressures exerted by the forming members 18 and 42, it being readily apparent that unless the collars 27 and 46 are provided, the pressure exerted between the magnetic material by the lower surface of the forming member 42 will be substantially equal to the pressure exerted upon the magnetic material by the upper surface of the forming member 18. This withdrawal of the segments 39 from the tapered aperture 36 is prevented by the resilient collars 27 and 46 which are compressed during the pressing operation in the manner illustrated in Fig. 3 to unbalance the pressures exerted by the forming members 42 and 18 to such an extent that the segments 39 do not withdraw from the tapered aperture 34. This is because a greater pressure is then applied to the upper surfaces of the beads 44 than is applied to the lower surfaces thereof.

When the required amount of pressure has been applied to the magnetic material disposed in the opening 40, the lower platen 11 is lowered and the base plate 15 together with the apparatus carried by it is removed from the press. The forming member 42 is then removed from the opening 40 and the die 38 is removed from its holder 34, after which the segments 39 are separated from each other to permit removal of the completed magnet core.

What is claimed is:

1. Molding apparatus comprising a plurality of forming members, means for causing relative motion between the forming members to exert pressure on matter disposed between them, a die member cooperating with the forming members, and means for unbalancing the pressure applied to the matter to hold the die member in an operative position with respect to the forming members.

2. Molding apparatus comprising a forming member, a second forming member, means for causing relative motion between the forming members, a die member slidably engaging the forming members, and yielding means for holding the die member in an operative position with respect to the forming members.

3. Molding apparatus comprising a forming member, a second forming member, means for causing relative motion between the forming members, a die member cooperating with the forming members, a second die member also cooperating with the forming members, and yielding means for holding the die members in operative positions with respect to each other when the first-mentioned means is effective.

4. Molding apparatus comprising a forming member, a second forming member, means for causing relative motion between the forming members, a die member slidably engaging the forming members, a holder for the die member, and yielding means for preventing relative movement between the die member and its holder.

5. Molding apparatus comprising a forming member, a second forming member, means for causing relative motion between the forming members, a holder having a tapered aperture, a die member seated in the tapered aperture and slidably engaging the forming members, and yielding means interposed between the holder and the first forming member for preventing relative movement between the die member and its holder.

6. Molding apparatus comprising a punch member, a second punch member, a holder having a tapered aperture, a plurality of die members seated in the tapered aperture and slidably engaging the punch members, and yielding means for preventing relative movement between the die members and the holder.

7. Molding apparatus comprising a forming member, a second forming member, means for causing relative motion between the forming members, a holder having a tapered aperture, a die member seated in the tapered aperture and slidably engaging the forming members, and means interposed between the holder and one of the forming members for resisting relative motion between the die and its holder.

8. In apparatus for molding articles with inserts, a plurality of segmental die members, and yielding means for holding an insert in a predetermined position with respect to the die members.

9. In molding apparatus, an annular die member comprising a plurality of segments having radially disposed surfaces, and having passages formed in said surfaces to receive matter extruded from the die during the operations of the forming apparatus.

In witness whereof, I hereunto subscribe my name this 7th day of January A. D., 1925.

WILLIAM STEVENS BUTTLES.